T. DOWLING.

Assignor to self and I. C. MAYO.

Pump.

No. 8,243. Reissued May 21, 1878.

Witnesses.
E. A. Phelps.
C. G. Reyes

Inventor
Thomas Dowling
by his Attorney, E. S. Spencer.

N. PETERS, PHOTO-LITHOGRAPHER, WASHINGTON, D. C.

UNITED STATES PATENT OFFICE.

THOMAS DOWLING, OF GLOUCESTER, MASSACHUSETTS, ASSIGNOR TO HIMSELF AND ISRAEL C. MAYO, OF SAME PLACE.

IMPROVEMENT IN PUMPS.

Specification forming part of Letters Patent No. 150,544, dated May 5, 1874; Reissue No. 8,243, dated May 21, 1878; application filed December 19, 1877.

*To all whom it may concern:*

Be it known that I, THOMAS DOWLING, of Gloucester, Essex county, Massachusetts, have invented certain Improvements in Pumps; and that the same are fully described in the following specification and illustrated in the accompanying drawing.

My invention consists in the devices and combination of devices set forth in the several claims.

Figure 1:
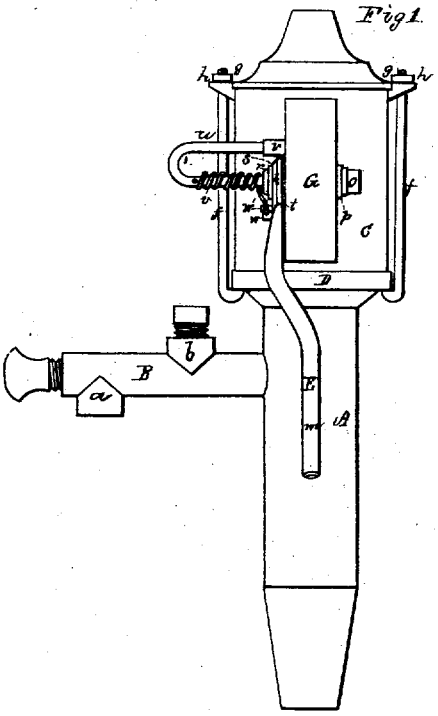
Figure 2:
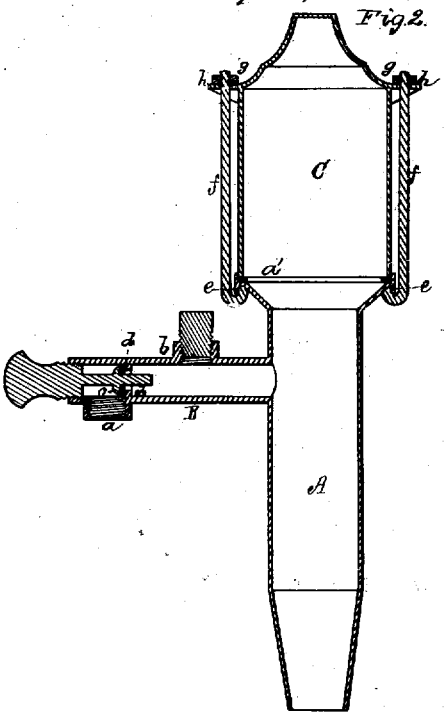
Figure 3:
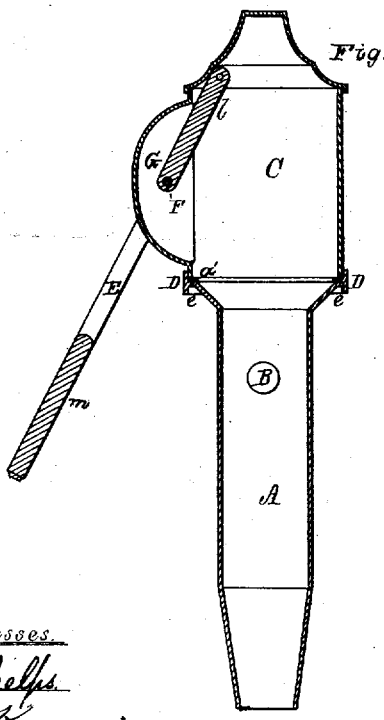
Figure 4:
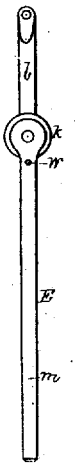
Figure 5:
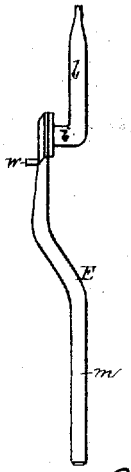
Figure 6:
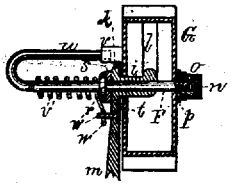

In the drawing, Figure 1 is a side elevation of a pump embodying my improvements. Fig. 2 is a vertical section taken through the spout; and Fig. 3, a similar view on a plane at right angles to that of Fig. 2. Figs. 4 and 5 show the pump-handle in different positions, while Fig. 6 is a vertical section through the parts immediately connected with the spindle.

In the several figures, A denotes the pump-barrel, and B the spout, having the two discharge-orifices *a b*. Between these orifices is a valve-seat, *d*, which serves, in connection with a valve, *c*, to close the passage to the lower or outer orifice *a* and divert the liquid elevated by the pump so that it shall be forced out of the orifice *b*, or up through a pipe leading therefrom. As shown in Fig. 2, the valve *c*, faced with a thin packing-ring, is closed upon its seat *d* by compression effected by a screw formed on the valve-stem, so that the operator may force the valve on or off its seat. I thus produce, without expensive fitting, a durable and effective valve, not liable to wear in its bearings. A screw plug or cap may be employed to close the orifice *b* when not in use.

A peculiar feature of my invention is the rotary air-chamber C, to which the pump-handle is attached, and which is so mounted upon the top of the pump-barrel as to enable the air-chamber to be turned around upon its seat and clamped thereto, in order to adjust the pump-handle in any desired position relatively to the spout. The manner in which I have chosen to illustrate this part of my invention is represented in Figs. 1, 2, and 3. The upper end of the barrel has a circular lip, *e*, forming part of a socketed head, D, within which is a packing-ring, *a'*, upon which the lower edge of the air-chamber rests, and against which it is forced by screw-rods *f* and nuts *g*. These rods hook upon the lip *e*, and extend up through ears *h* projecting from the air-chamber, and by this means the chamber C and barrel A are united in such a manner that the one may be readily turned upon the other. Thus the position of the handle, which is mounted upon the air-chamber, may be varied with relation to the spout as occasion may require.

The handle E (shown in several of the figures) is original in construction. It consists of a tubular body, *i*, a head, *k*, and arms *l m*, the former projecting inwardly from the inner end of the body *i*, and the latter outwardly from the head *k*. This handle oscillates upon a spindle, F, passing through the tubular body *i*, and supported by the opposite sides of a hollow projection, G, forming part of the air-chamber. The peculiar construction of the pump-handle enables it to be readily inserted in and withdrawn from the extension G, or the hole in one side thereof, as occasion may require. I shape the long arm *m* of the handle, as shown in Figs. 1, 3, and 5, so as to bring its outer end into the same vertical plane as the arm *l*. The spindle F is provided with a shoulder, *r*, and at the end with a screw, *n*, to receive a nut, *o*, and leather washers are interposed upon the spindle and the body *i* at points *p s t*, so as to make tight joints when the nut *o* is screwed up. Thus the chamber C becomes an air-tight reservoir, since the packing-ring *a'* between the chamber and barrel A precludes the admission of air at that point, and the washers perform a like service at the junction of the handle with the extension G, so that air can pass to and from the chamber C only through the barrel or spout.

A peculiarity of the spindle remains to be described. Beyond the shoulder *r* the spindle is prolonged, and formed with a leg, *u*, to extend into either of two socketed studs, *v w*, projected from the side of the extension G, one being above and the other below the spindle. A helical spring, *v'*, wound around the spindle, and having one end fixed thereto and the other to the handle, or to a stud, *w'*, extending therefrom, serves to force downward the longer arm of the handle, and to aid the handle in lifting the piston. By turning the spindle around and setting it in one or the other of the socketed studs, the spring can be taken up or let out, so as to vary its pressure, and set the spindle so that the wear of the handle upon it may not be all on one side of it.

My pump is to be furnished, like the common lifting-pump, with a piston-rod and piston provided with one or more valves to open upward, there being below it, in the barrel, a valve or valves to open upward in a manner well known.

I claim as my invention—

1. A pump-barrel bearing a spout and having a suitable packing-ring at its upper end, in combination with an air-chamber resting by its lower edge on said packing, adjustable thereon by rotation, and bearing the pump-handle, said parts being united by vertical clamping-bolts for securing a tight joint, substantially as set forth.

2. A pump-barrel and a spout therefor, having two discharge-orifices, as described, and a valve-seat between said orifices, in combination with a valve adapted by compression to direct the flow of water to either orifice, substantially as set forth.

3. A pump-barrel bearing a spout and provided with an outwardly-projecting flange, in combination with an adjustable rotary air-chamber of greater internal diameter than the barrel, so as to permit free play and convenient connection of the piston-rod and lever-arm within the air-chamber, substantially as set forth.

4. The pump-handle E, composed of the tubular body *i*, having a suitable fulcrum, and two arms, *l m*, the latter being formed with an offset to bring its lower part in line with the arm *l*, substantially as set forth.

5. The combination, with a pump-handle, of the spindle F, having screw *n* and nut *o*, and also formed with the leg *u*, for insertion in either of the sockets *v w*, substantially as set forth.

6. The combination of the spring *v'* with a pump-handle and its supporting-spindle F, formed with the leg *u*, adapted to engage with the studs *v w*, substantially as set forth.

THOMAS DOWLING.

Witnesses:
JOHN W. PLOUFF,
CHARLES H. OXTON.